United States Patent
Moser et al.

(10) Patent No.: US 7,233,864 B2
(45) Date of Patent: Jun. 19, 2007

(54) METHOD FOR IMPROVING GPS INTEGRITY AND DETECTING MULTIPATH INTERFERENCE USING INERTIAL NAVIGATION SENSORS AND A NETWORK OF MOBILE RECEIVERS

(75) Inventors: Michael Moser, Fluorn-Winzeln (DE); Arne Dietrich, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/495,010

(22) Filed: Jul. 27, 2006

(65) Prior Publication Data
US 2006/0265129 A1 Nov. 23, 2006

Related U.S. Application Data

(62) Division of application No. 10/615,427, filed on Jul. 7, 2003, now Pat. No. 7,110,882.

(51) Int. Cl.
*G01C 21/00* (2006.01)
(52) U.S. Cl. ............... 701/214; 701/207; 701/213; 701/220; 342/357.06
(58) Field of Classification Search ........... 701/207, 701/213, 215, 220, 225, 214; 342/357.06, 342/357.08, 357.09, 357.12, 357.15
See application file for complete search history.

(56) References Cited

U.S. PATENT DOCUMENTS

| | | | |
|---|---|---|---|
| 4,743,913 A | 5/1988 | Takai | |
| 5,534,875 A * | 7/1996 | Diefes et al. | 342/357.11 |
| 5,675,518 A | 10/1997 | Kuroda et al. | |
| 5,710,565 A | 1/1998 | Shirai et al. | |
| 6,029,496 A | 2/2000 | Kreft | |
| 6,268,804 B1 | 7/2001 | Janky et al. | |
| 6,289,278 B1 | 9/2001 | Endo et al. | |
| 6,480,787 B2 | 11/2002 | Yoshikawa et al. | |
| 6,577,952 B2 | 6/2003 | Geier et al. | |
| 6,798,357 B1 * | 9/2004 | Khan | 340/989 |
| 2003/0204310 A1 | 10/2003 | Tanaka et al. | |

FOREIGN PATENT DOCUMENTS

| | | |
|---|---|---|
| JP | 08 086 853 A | 4/1996 |
| JP | 10 002 743 A | 1/1998 |

* cited by examiner

*Primary Examiner*—Gertrude A. Jeanglaude
(74) *Attorney, Agent, or Firm*—Kenyon & Kenyon LLP

(57) ABSTRACT

A method for checking the integrity of GPS measurements for a moving vehicle includes determining a first inter-vehicle distance between a first vehicle and a second vehicle based on GPS measurements obtained at both vehicles, independently determining a second inter-vehicle distance based on relative motion of the first vehicle and the second vehicle obtained using INS sensors at both vehicles, and comparing the first and second inter-vehicle distances. The integrity of the GPS measurements are checked if the first and second inter-vehicle distances are nearly equivalent. Methods for error detection and for mapping GPS multipath levels at each point in a vicinity for an entire range of satellite constellations are also described.

4 Claims, 6 Drawing Sheets vehicle 1 vehicle 2 vehicle 3 vehicle 4 vehicle 1 vehicle 2 vehicle 3 vehicle 4

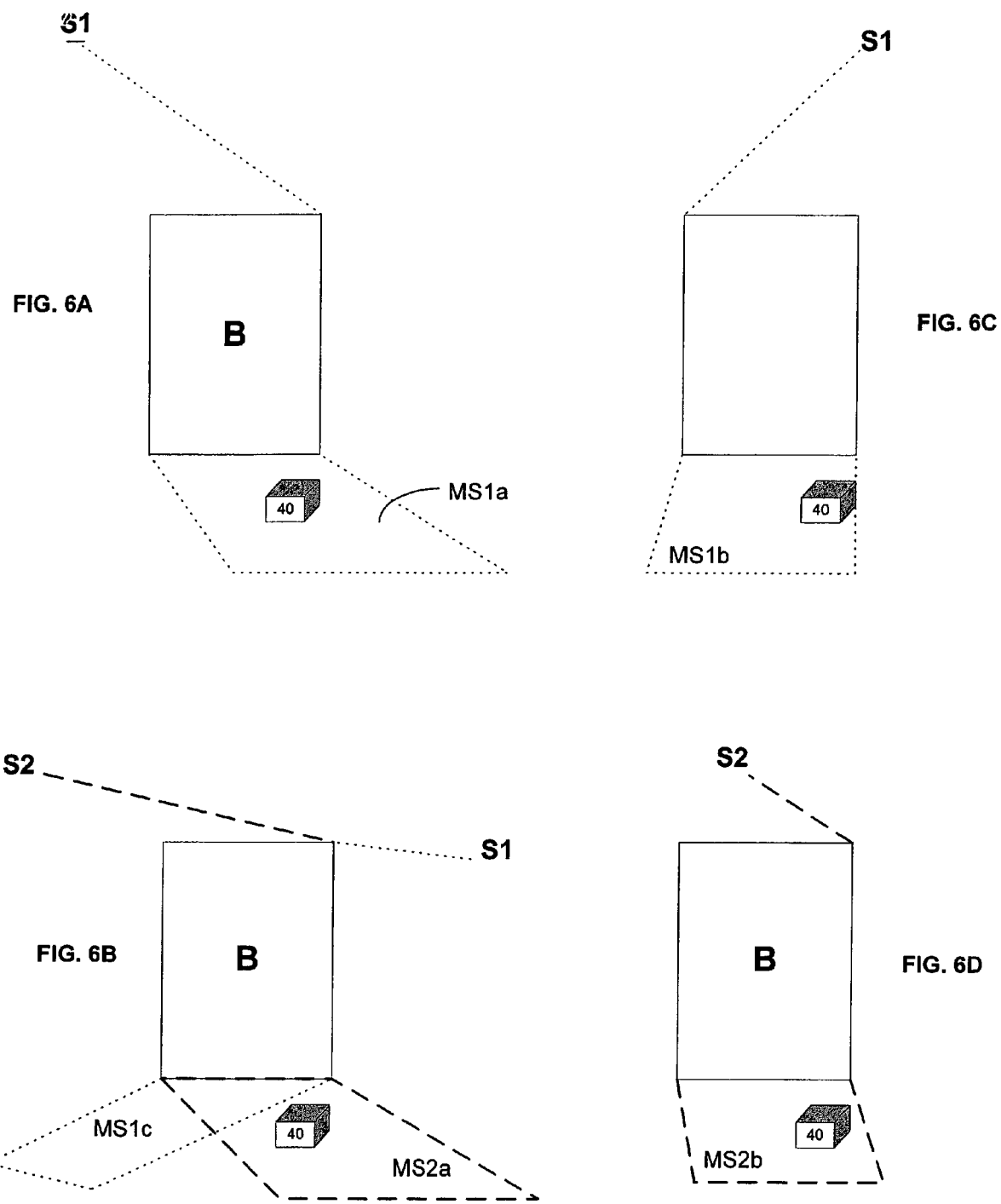

METHOD FOR IMPROVING GPS INTEGRITY AND DETECTING MULTIPATH INTERFERENCE USING INERTIAL NAVIGATION SENSORS AND A NETWORK OF MOBILE RECEIVERS

CROSS-REFERENCE TO RELATED APPLICATION

This application is a division application of prior U.S. application Ser. No. 10/615,427 filed Jul. 7, 2003, now U.S. Pat. No. 7,110,882 which is hereby incorporated by reference.

FIELD OF THE INVENTION

The present invention relates to vehicle navigation using the global positioning system (GPS) and more particularly relates to a method for checking the integrity of GPS signals for errors and for detecting GPS multipath interference. The present invention further relates to a method for multipath modeling and correction based on detected levels of multipath interference.

BACKGROUND INFORMATION

Generally, most systematic sources of error in differential GPS (DGPS), such as clock error, can be canceled or corrected to a large degree using conventional techniques. However, two sources of error which currently cannot be readily canceled or corrected are receiver error, and errors caused by multipath interference. Receiver errors typically arise from a malfunction in a component of a receiver tuned to a particular GPS satellite and have little correlation with the position of the receiver. In contrast, multipath interference, i.e., the interference caused by arrival of a signal from a single source at a receiver at slightly different times due to different path lengths, depends directly on the geometry of reflecting surfaces in the vicinity of the receiver in question.

More precisely, multipath interference depends on the positions of the receiving antenna, the reflecting object(s) and the satellite geometry. Therefore, there are three distinct ways that multipath interference changes over time. Satellite movements change the line-of-sight vector (between the receiver and the satellite) in a slow, smooth and predictable manner. The resulting multipath changes correlated with such satellite movements reflect this, in that they are low frequency, slowly changing and "smooth". Reflectors can be divided into two classes: moving (such as nearby vehicles) and fixed (such as the ground and nearby buildings). Multipath interference from moving objects tends to be high frequency in nature, and weakly correlated to antenna position, whereas multipath interference caused by fixed objects is highly correlated to antenna (and satellite) position. In addition, when the antenna is on a mobile vehicle, its own movements can vary widely in terms of speed and direction. Owing to the variability of these conditions over even short lengths, there is usually little correlation of multipath-errors for baselines longer than a few meters.

Multipath interference therefore severely limits the achievable accuracy of DGPS. In urban areas having a high density of buildings (potential reflectors), the accuracy of DGPS can easily degrade from about 1–2 m under multipath-free conditions to up to tens of meters. This renders DGPS unsuitable for applications that demand high accuracy and integrity, and in particular, forbids the use of DGPS for safety relevant applications.

SUMMARY OF THE INVENTION

According to one aspect of the present invention, a method for checking the integrity of GPS measurements for a moving vehicle is provided. The method includes determining a first inter-vehicle distance between a first vehicle and a second vehicle based on GPS measurements obtained at both vehicles, independently determining a second inter-vehicle distance based on relative motion of the first vehicle and the second vehicle obtained using INS sensors at both vehicles, and comparing the first and second inter-vehicle distances. The integrity of the GPS measurements are checked if the first and second inter-vehicle distances are nearly equivalent.

In another aspect, the present invention provides a method of detecting an error at a particular vehicle by communicating GPS data among multiple vehicles within a given vicinity in which test series data are generated at each vehicle for each pair of vehicles receiving GPS signals from a same satellite, the test series data for each pair comprising a difference between a first inter-vehicle distance between the pair of vehicle calculated based on GPS data and a second inter-vehicle distance independently calculated based on INS sensors in each of the pair of vehicles. Test series having values greater than a threshold are identified, indicating an error. If an error is indicated, it is then determined which of the multiple vehicles the error occurs in by comparing the test series data generated at each vehicle.

In a further aspect, there is a method of mapping GPS multipath levels at each point in a vicinity for an entire range of satellite constellations. A GPS multipath error is detected at a given point in the vicinity for a particular satellite constellation using multiple roving GPS receivers. The multipath error is recorded as a GPS multipath level for the particular point and satellite constellation. This process is then repeated for all other points in the vicinity and at different times to capture the entire range of satellite constellations.

The present invention also provides a vehicle system for checking the integrity of GPS measurements for a moving vehicle. The vehicle system includes means for receiving GPS signals and for determining a GPS pseudo range for the vehicle, means for communicating with a second vehicle within a vicinity of the vehicle, a processor capable of determining a first inter-vehicle distance between the vehicle and the second vehicle based on the pseudo range of the vehicle and on GPS measurements communicated from the second vehicle, and an INS system including inertial sensors, the INS system providing information allowing the processor to determine a relative motion of the first vehicle. The processor determines a second inter-vehicle distance based on the relative motion of the first vehicle and on a relative motion of the second vehicle communicated from the second vehicle, and compares the first and second inter-vehicle distances, the integrity of the GPS measurements being checked if the first and second inter-vehicle distances are nearly equivalent.

In another aspect, the present invention provides a system for providing a mapping of GPS multipath levels at each point in a vicinity for an entire range of satellite constellations which includes a central information depository and multiple roving GPS receivers that include means for detecting a GPS multipath error at a given point in the vicinity for a particular satellite constellation. The multipath is recorded as a GPS multipath level for the particular point and satellite constellation at the central information depository, and the detection of multipath error is repeated for all other points in the vicinity and at different times to capture the entire range of satellite constellations, which are then stored as multipath levels at the central information depository.

BRIEF DESCRIPTION OF THE DRAWINGS

FIGS. 6A through 6D are schematic illustrations showing tracking of changes in multipath in an area adjacent to a building due to changes in satellite positions.

DETAILED DESCRIPTION

According to the present invention, in-vehicle navigation systems and inter-vehicle data communication are used to correct for receiver errors and to detect multipath interference (hereinafter referred to as "multipath"). For each pair of vehicles in the same vicinity, a test series of comparison data is generated.

Figure 1:
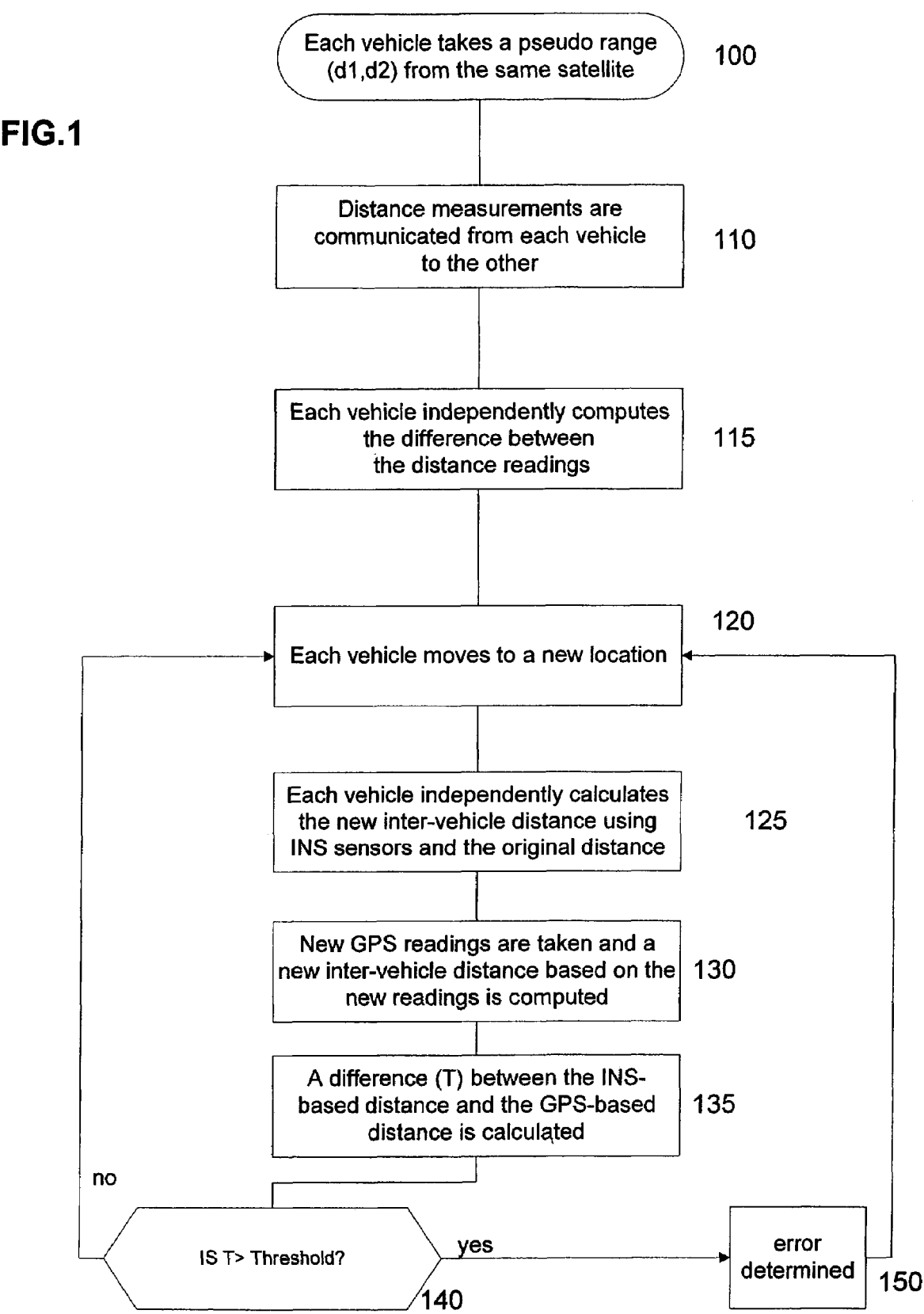
FIG. 1 is a flow chart of an exemplary method for generating a test series of data for a pair of GPS-enabled vehicles in the same vicinity with respect to a single GPS satellite according to the present invention.

FIG. 1 is a flow chart of an exemplary method for generating a test series of data for a pair of GPS-enabled vehicles in the same vicinity according to the present invention. Generally, vehicles within one or two kilometers of each other are considered to be in the same vicinity. In an initial step 100, each vehicle takes a pseudo range measurement $d_1$, $d_2$ from the same GPS satellite. In step 110, these measurements are communicated from each vehicle to the other using two-way communication or any other suitable wireless communication system. In step 115, each vehicle computes the difference $\Delta_1$ (=$d_1$-$d_2$) between the measurements. As the distance between each vehicle and the GPS satellite is far greater than the distance between the vehicles (the "inter-vehicle distance"), the baseline difference $\Delta_1$ between the measured readings is equivalent to the distance vector between the vehicles projected onto the line of sight vector to the satellite. Therefore, the difference $\Delta$ serves as a measure of the inter-vehicle distance.

Additionally, since the GPS signals arriving at the receivers at each respective vehicle travel through approximately equivalent atmospheric conditions, and ephemeris errors have the same effect on both signal measurements, the only sources of error in the difference measurement $\Delta_1$ are multipath, receiver error, and clock error. Because clock errors can be eliminated by using the method of single differences, multipath and receiver error are the only sources of error that distort the inter-vehicle distance measurement that cannot be readily corrected.

As each vehicle moves, in step 120, the value of $\Delta$ also changes. Each vehicle may be equipped with a set of independent motion sensors in an inertial navigation system (INS). These sensors may include wheel speed sensors and inertial sensors such as gyroscopes and accelerometers (collectively referred to hereinafter as INS sensors) through which the relative motion of the vehicle between points can be determined. The utilization of inertial sensors in an INS for determining relative motion is described in greater detail in commonly assigned and co-pending patent application Ser. No. 10/308,730, entitled "INS-based User Orientation and Navigation". In step 125, each vehicle calculates the new inter-vehicle distance ($\Delta_{INS}$) using the INS sensors and the original baseline difference $\Delta_1$. Simultaneously or immediately thereafter, in step 130, a new set of GPS readings is taken and a new intervehicle distance $\Delta_2$ is computed. In step 135, a difference (T) between the INS-based distance $\Delta_{INS}$ and the GPS-based difference $\Delta_2$ is calculated. Over short time spans, values for $\Delta_{INS}$ and for $\Delta_2$ should be close to each other, and the value of T (=$\Delta_{INS}$-$\Delta_2$) should be close to zero.

Steps 120 to 135 are repeated numerous as both vehicles move, and a series of comparison data points referred to as a "test series" is gathered and plotted over time. Under error-free conditions, the test series should appear as unbiased noised with a small standard deviation of approximately one meter. If, in step 140, the test series shows a systematic bias greater than a specified threshold value of $\epsilon$ meters, then, in step 150, it is determined that an error exists. In this case the error can be from three sources: receiver error in one of the vehicles, multipath error in one or both of the vehicles, and INS error in one of the vehicles (the likelihood of a simultaneous receiver/sensor error in both vehicles is taken to be extremely small). An error in a receiver tuned to a particular satellite can be distinguished from multipath and INS errors by repeating the process outlined above for each visible GPS satellite. This process isolates the particular satellite/receiver link that is in error, e.g., it indicates that a receiver in one of the vehicles for satellite 1 is in error, while the receivers for satellite 2 are functioning properly, but does not indicate which of the pair of vehicles the error has occurred in. Correct identification of both the type of error and the vehicle in which it occurs can be attained using hypothesis testing using the already-provided GPS and INS data. Alternatively, such identification can be attained by sharing GPS data among multiple vehicles in the same vicinity, where "multiple" refers to a number of vehicles greater than two.

Figure 2:
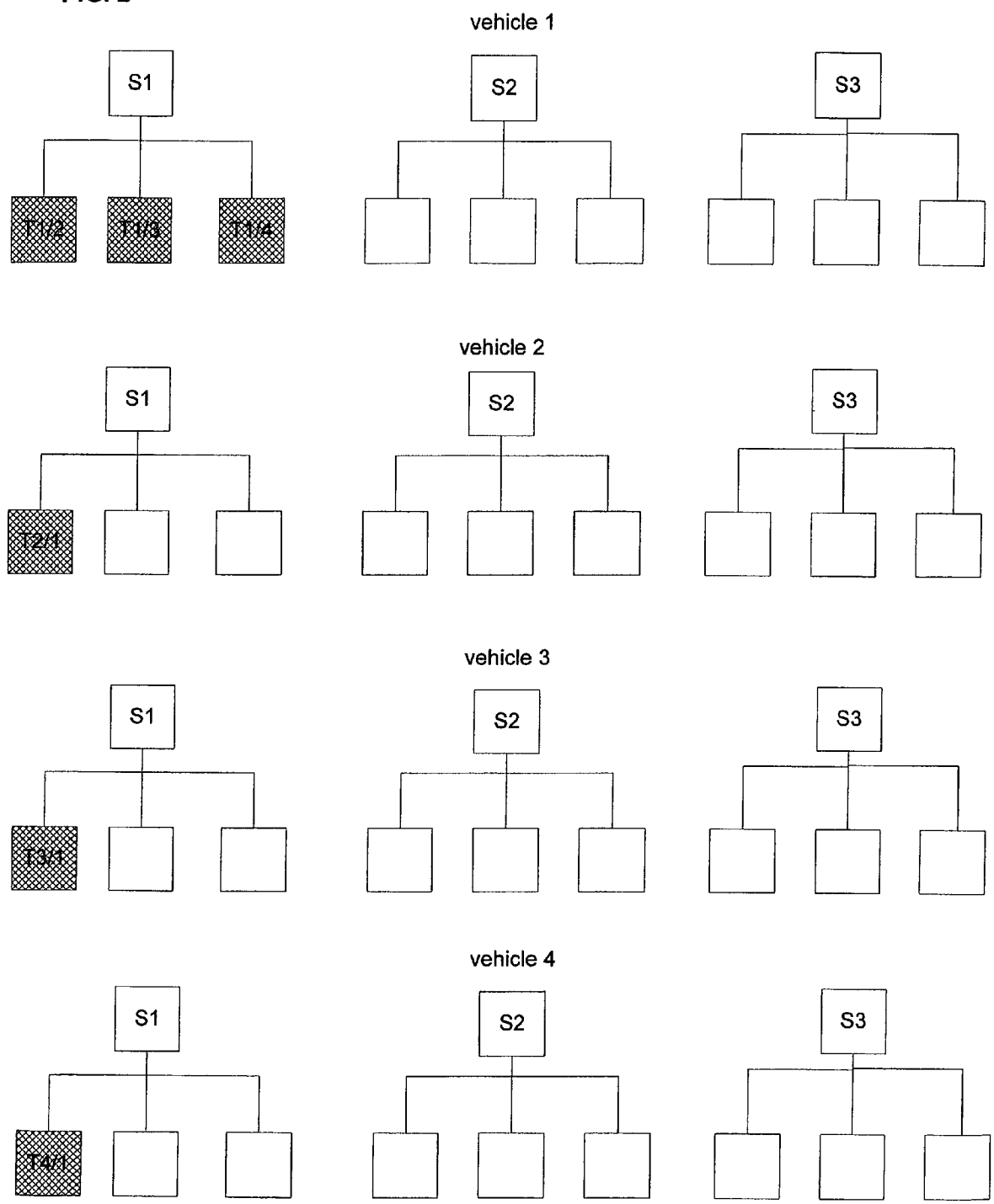
FIG. 2 is a schematically illustration of a method for identifying a receiver error at a particular vehicle using test series data in an exemplary scenario.

FIG. 2 schematically illustrates a method for identifying a receiver error at a particular vehicle using test series data in an exemplary scenario in which four vehicles 1, 2, 3, 4 share GPS communication data with respect to three different GPS satellites S1, S2, S3. As shown, vehicle 1 obtains a test series with respect to each of the other communicating vehicles for each satellite. For a first satellite S1, car 1 obtains a test series T1/2 (S1) in the manner discussed above, where 1/2 indicates that the test series compares vehicle 1 and vehicle 2, and (S1) denotes that the test series is taken with respect to GPS measurements from S1. Similarly, vehicle 1 also obtains test series T1/3(S1) and T1/4(S1) which are comparisons with vehicle 3 and 4, respectively. The test series are shown grouped according to the pertinent GPS satellite. Test series are also obtained with respect to satellites S2 and S3. Each of the other vehicles obtain corresponding test series. For example, vehicle 2 obtains test series 2/1, 2/3 and 2/4 for satellites S1, S3 and S4, vehicle 3 obtains test series 3/1, 3/2 and 3/4, and vehicle 4 obtains test series 4/1, 4/2, and 4/3 for satellites S1, S2 and S3. It is generally noted that the test series T "n"/"m"(S "r") for vehicle number "n" should be equivalent to the test series T "m"/"n" (S "r"), where n, m, and r are integers.

For the sake of illustrating the method of determining a receiver error, it is assumed that the receiver in vehicle 1 tuned to satellite S1 has a systematic error. Accordingly, all of the test series involving vehicle 1 and satellite S1 show a systematic bias beyond the threshold level, indicating an error. Each of these test series are indicated with cross-hatching in FIG. 2. Since there are more than two vehicles in communication, analysis of the test series demonstrates that while all of the test series involving vehicle 1 for satellite S1 are in error, none of the test series that do not involve vehicle 1, i.e., T2/3(S1), T2/4(S1), T3/4(S1) show any error. From this it can be deduced that the source of the error is at vehicle 1, and not at any of the other vehicles. However, more information is required in order to distinguish whether vehicle 1 is suffering from multipath with respect to satellite 1 from a more general receiver error. If the value of the test series changes abruptly over a time period (such as several seconds) following the determination of the error, it can then be deduced that the error is caused by multipath, and that vehicle 1 may be passing by buildings or other reflective objects.

Figure 3:
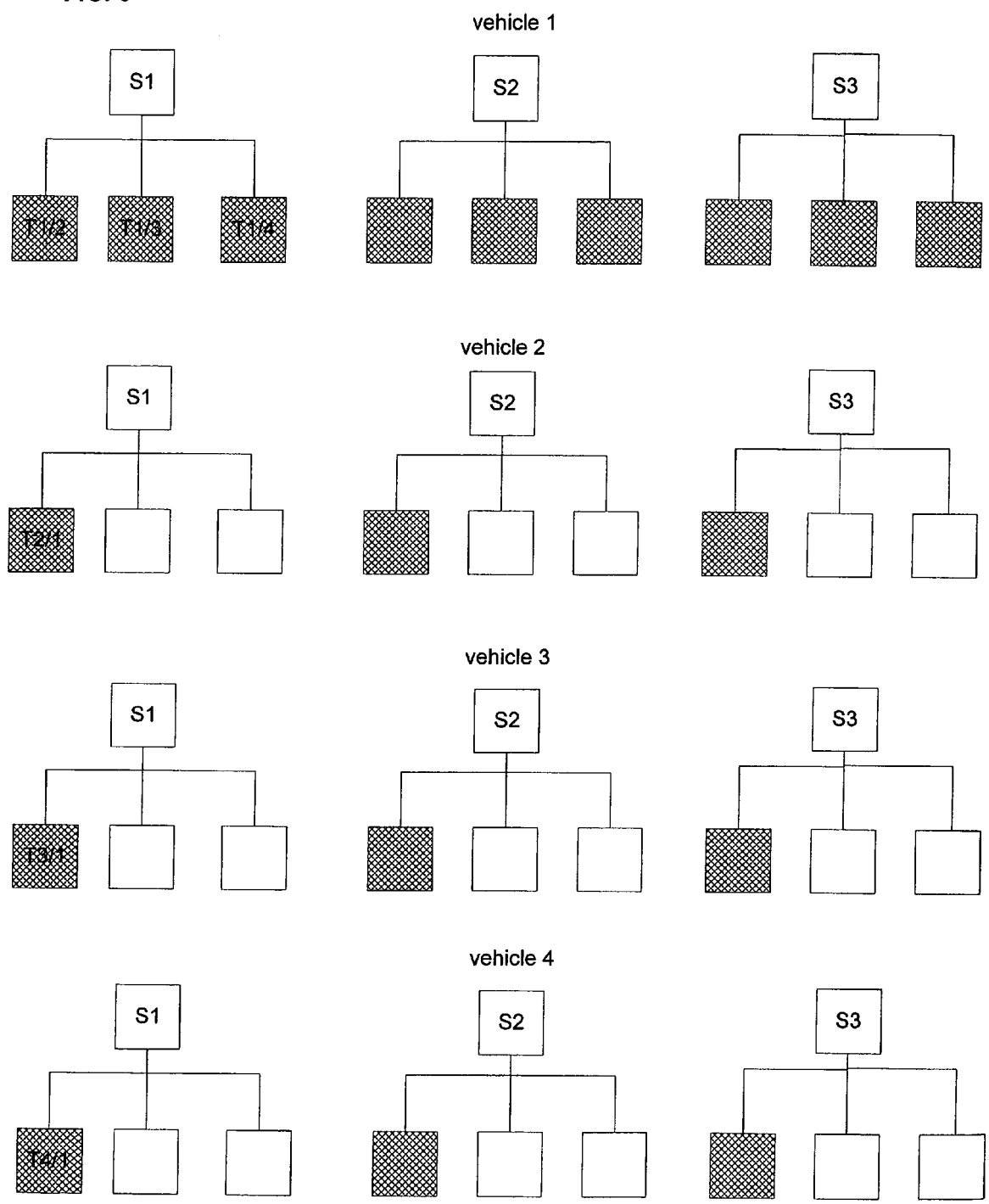
FIG. 3 is a schematic illustration of a method for identifying an INS error at a particular vehicle using test series data for the same arrangement of vehicles and satellites as in FIG. 2.

FIG. 3 schematically illustrates a method for identifying an INS error at a particular vehicle using test series data for the same arrangement of vehicles and satellites as in FIG. 2. As depicted, vehicle 1 has an INS error. The INS error may be caused by a malfunction in one or more of the sensors that detect motion parameters of the vehicle. This error causes all estimations of relative motion of vehicle 1 to be off base, and therefore the test series concerning vehicle 1 show a systematic error (shown with cross-hatching) unless the relative motion of vehicle 1 is orthogonal to the line of sight vector from vehicle 1 to a particular satellite. In the latter case, an error in the test series with respect to that satellite will not be detected. In the general case, in which the motion of vehicle 1 is not completely orthogonal to the line of sight vector to any satellite, this situation differs from the scenario depicted in FIG. 2 depicting a receiver error in that the test series for all three satellites S1, S2 and S3 show errors, and not only those concerning satellite S1. In this manner, INS errors can be easily distinguished from receiver and multipath error.

The methods for error detection and identification outlined above are most reliable when the number of vehicles involved is high, and the number of errors is small. Once the number of erroneous measurements amounts to a significant fraction of the number of actual measurements these methods may not work as well. However, by extending the baseline limit for vehicle inter-communication up to tens of kilometers, the number of vehicles sampled for test series can be increased, albeit with a somewhat decreased level of accuracy. In an area of this size, it is generally possible to find a control group of vehicles which have good, error-free conditions. This group can be used as reference by the other vehicles in the area. The reference group can be changed dynamically to maintain optimal performance, as some vehicles in the control group encounter worse conditions, such as a region of extensive multipath, and other cars enter more benign areas.

Figure 4:
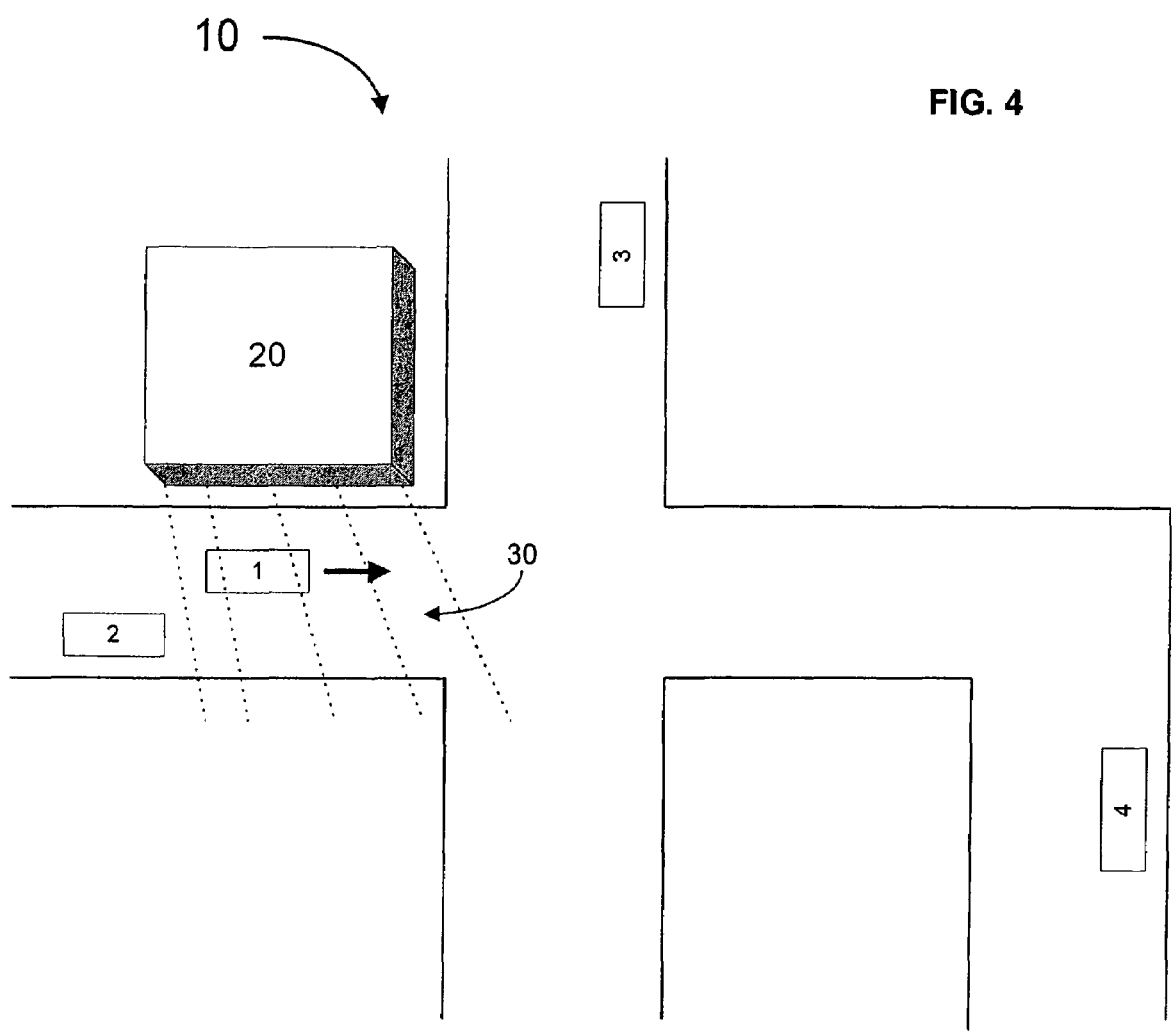
FIG. 4 is a block diagram illustrating an exemplary driving situation where multipath affects GPS measurement.

The error isolation techniques discussed above can also be employed in a method for multipath correction according to the present invention. Multipath can be considered a function of receiver antenna position, i.e., the position of the receiving vehicle, and satellite position:

$$\text{Multipath} = M(l_{vh}, l_{sat1}, \ldots l_{satn})$$

where $l_{vh}$ and $l_{sat1}, \ldots l_{satn}$ represent the position of the vehicle and the position of satellites S1 to S(n), respectively. FIG. 4 illustrates an exemplary driving situation where multipath affects GPS measurement. The area 10 shown is approximately 200 meters by 200 meters, and includes vehicles 1, 2, 3 and 4 and building 20. As vehicle 1 passes to the right past building 20, it enters a region 30 adjacent to the building in which GPS signals are obfuscated by reflections, and multipath is encountered. However, only satellite S1 is at an azimuth and elevation so as to be affected, and reception from the other satellites do not suffer from multipath degradation. As the building is square and has an even surface, there will be a detectable difference in multipath as vehicle 1 passes into and out of region 30.

Figure 5A:
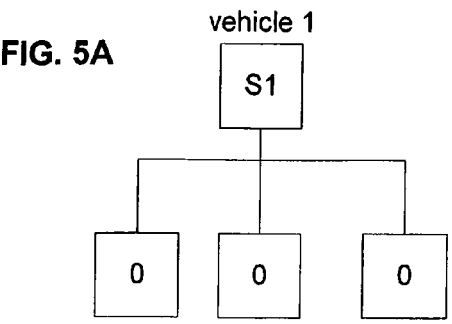
FIGS. 5A and 5B show an exemplary difference in test series obtained by vehicle two between a time just before it enters a multipath region and at a time during which it is within the multipath region.
Figure 5A:
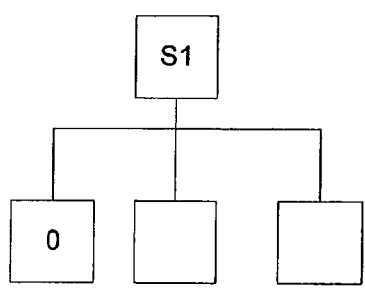
Figure 5A:
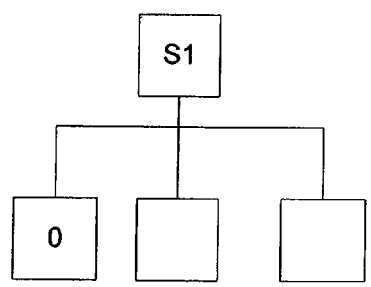
Figure 5A:
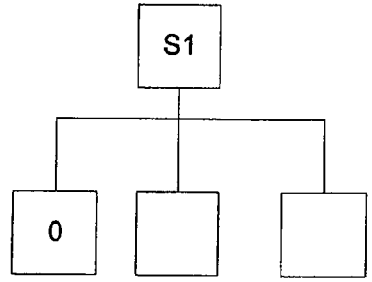
Figure 5B:
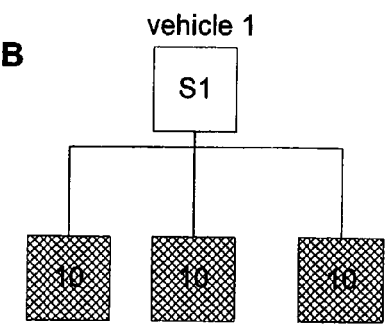
Figure 5B:
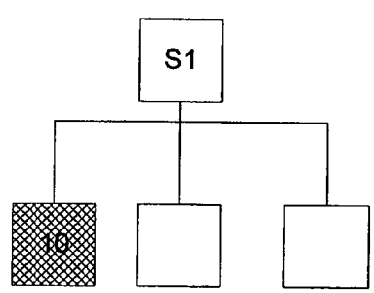
Figure 5B:
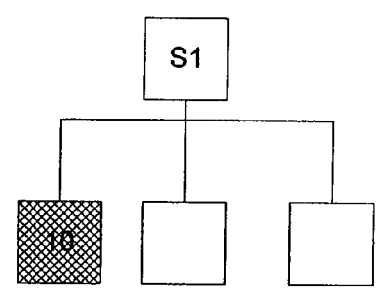
Figure 5B:
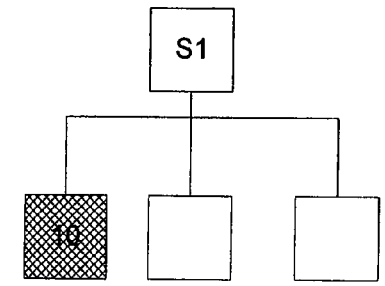

FIGS. 5A and 5B show an exemplary difference in test series obtained by vehicle two between a time just before it enters region 30 (FIG. 5A) and a time during which it is within the region (FIG. 5B) as shown in FIG. 4. In FIG. 5A, each of the test series involving vehicle 1 and satellite S1 show a level of approximately zero meters (or receiver noise). As shown in FIG. 5B, when vehicle 1 enters region 30, the test series involving vehicle 1 and satellite S1 jump to 10 meters (for example). After the vehicle passes through region 30, the test series reverts back to zero (not illustrated). Since, as noted above, multipath is a function of vehicle position and satellite position, if the coordinates of S1 are known at the time vehicle 1 enters region 30, and the geographical coordinates of the relatively small region 30 are also known, then the test series reading of 10 meters represents the level of multipath given these two positions.

Significantly, this detected multipath level can then be communicated to the other vehicles 2, 3, 4 in the vicinity. The other vehicles can then use this information to correct the multipath level when they pass through the same position if the position of S1 remains approximately the same (i.e., if only a small amount of time has passed from the initial reading). This may be done by simply adding or subtracting, as the case may be, 10 meters from the GPS measurements taken within region 30 where the test series jump. To provide further reliability for the multipath reading, test series for other vehicles passing through the region 30 can be used to confirm the initial reading.

The multipath detection and correction process can be extended to a full modeling or mapping of the multipath in a given area for a range of satellite constellations. An exemplary illustration of changes in multipath in an area adjacent to a building is shown with reference to FIGS. 6A–6D. As shown in FIG. 6A, at time $t_1$, the configuration of satellite S1 and building B causes a multipath area MS1$a$ to form adjacent to the building. A fixed object 40 including a GPS receiver is within area MS1$a$ and is able to detect and record the level of multipath at this time. At a later time $t_2$, shown in FIG. 6B, the line of sight to satellite S1 has moved and the area of multipath has changes from MS1$a$ to MS1$b$. Since the object 40 is within MS1$b$, it detects and records a level of multipath which may or may not be the same as the level detected at time $t_1$. At time $t_3$, shown in FIG. 6C, the line of sight to S1 moves again, and a satellite S2 shifts to a position where its signals can be detected in the area in question. In the new position of S1, the area for multipath MS1$c$ has shifted so that object 40 is no longer affected by multipath reception with respect to S1, but object 40 is now within the multipath area MS2$a$ for satellite S2. Thus, the level of multipath detected and recorded by object 40, which reflect the multipath with respect to S2, in effect records the total multipath at its position for the entire constellation of visible satellites S1, S2 at time $t_3$. In FIG. 6D, showing the visible constellation at time t4, S1 has moved out of the visible range, and object 40, within area MS2*b*, detects and records the new multipath level with respect to S2.

Each of the recorded multipath levels at each time is recorded and stored for further use. In reality, the GPS receivers are moving (roving) vehicles, and the position at which they record multipath levels is not fixed, but changes over time. In this manner, multipath levels are recorded both at different times, and at different ground positions, so that over a suitable sampling period, multipath information can be accumulated which describes the multipath levels in a particular vicinity of the building B for all possible satellite constellations. Similarly, this process can be extended geographically beyond the vicinity of a single building to accumulate a multipath "map" of a region. This involves storing a large amount of data and therefore a centralized infrastructure can be used as a data repository. The centralized infrastructure may be equipped to broadcast this information wireless in broadband so that each vehicle can obtain a portion of this information, as need requires, to correct multipath in the area in which each travels. In this manner, the multipath in the vicinity of a mapped area can be corrected for all constellations, and is thereby made virtually multipath-free to each vehicle. As the area around the building can then be considered a "benign" area, where no multipath errors occur, the entire GPS navigation system becomes more robust against other errors, and vehicles in the vicinity of the building can be used as a reference group. Additionally, each car could save the data for roads it uses often (e.g., on the way to work) and roads in this vicinity, and if a vehicle enters territory for which it does not have this information, it can communicate to other vehicles local to this area to obtain the local multipath map.

In the foregoing description, the method and system of the present invention have been described with reference to a number of examples that are not to be considered limiting. Rather, it is to be understood and expected that variations in the principles of the method and apparatus herein disclosed may be made by one skilled in the art, and it is intended that such modifications, changes, and/or substitutions are to be included within the scope of the present invention as set forth in the appended claims.

What is claimed is:

1. A method of mapping GPS multipath levels at each point in a vicinity for an entire range of satellite constellations, comprising:

a) detecting a GPS multipath error at a particular point in the vicinity for a satellite constellation using multiple GPS receivers that rove independently with respect to one another;

b) recording the multipath error as a GPS multipath level for the particular point and the satellite constellation; and c) repeating steps a) and b) for all other points in the vicinity and at different times to capture the entire range of satellite constellations.

2. The method of claim 1, wherein each of the multiple roving GPS receivers generates test series data for each pair of the roving receivers obtaining signals from a same GPS satellite, the test series data for each pair comprising a difference between a first inter-vehicle distance between the pair calculated based on GPS data, and a second inter-vehicle distance independently calculated based on INS sensors in each of the pair of vehicles.

3. A system for providing a mapping of GPS multipath levels at each point in a vicinity for an entire range of satellite constellations, comprising:

a central information depository; and multiple GPS receivers that rove independently with respect to one another, the multiple roving GPS receivers including means for detecting a GPS multipath error at a particular point in the vicinity for a particular satellite constellation;

wherein the multipath error is recorded as a GPS multipath level for the particular point and satellite constellation at the central information depository;

and wherein the detection of multipath error is repeated for all other points in the vicinity and at different times to capture the entire range of satellite constellations, the multipath errors being stored at the central information depository.

4. The system of claim 3, wherein the central information depository includes means for receiving wireless data signals, and the multiple roving GPS receivers are equipped with means for wirelessly transmitting GPS multipath errors as a data signal to the central information depository.

* * * * *